(No Model.) 2 Sheets—Sheet 1.

J. F. HANLEY.
MECHANICAL MOVEMENT.

No. 376,303. Patented Jan. 10, 1888.

WITNESSES:
Fred. G. Dieterich
Leon C. Kenion

INVENTOR:
J. F. Hanley
BY Munn & Co.
ATTORNEYS.

N. PETERS, Photo-Lithographer, Washington, D. C.

(No Model.) 2 Sheets—Sheet 2.
J. F. HANLEY.
MECHANICAL MOVEMENT.
No. 376,303. Patented Jan. 10, 1888.
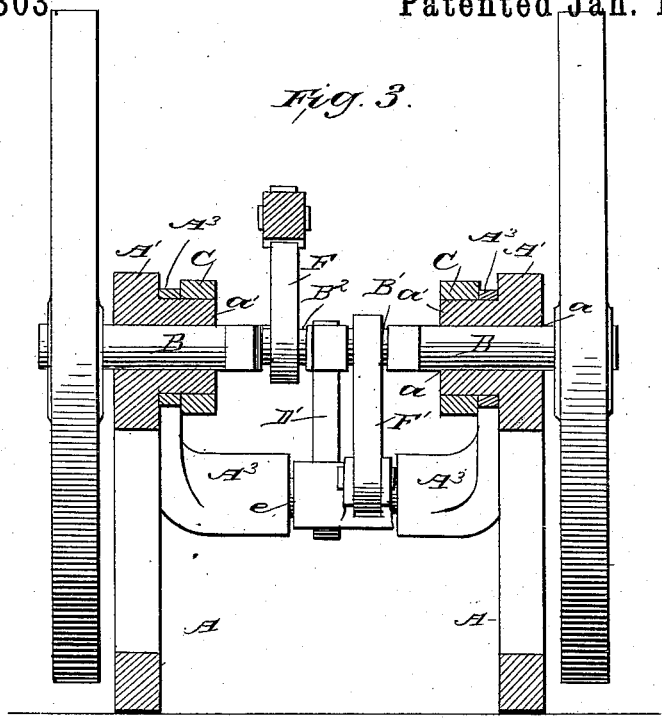
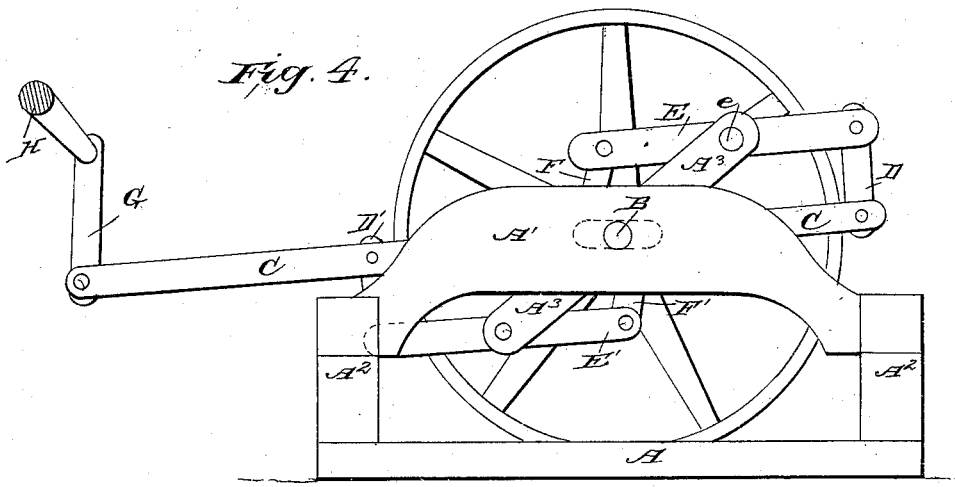
WITNESSES:
Fred. G. Dieterich
Ocean C. Kennon
INVENTOR:
J. F. Hanley
BY Munn & Co
ATTORNEYS.

UNITED STATES PATENT OFFICE.

JAMES F. HANLEY, OF CHARLESTON, SOUTH CAROLINA.

MECHANICAL MOVEMENT.

SPECIFICATION forming part of Letters Patent No. 376,303, dated January 10, 1888.

Application filed August 5, 1887. Serial No. 246,230. (No model.)

*To all whom it may concern:*

Be it known that I, JAMES F. HANLEY, of Charleston, in the county of Charleston and State of South Carolina, have invented a new and useful Improvement in Mechanical Movements, of which the following is a specification.

My invention relates to machines for converting motion; and the object of my invention is to provide a compact arrangement of parts, which may be run at a high speed, will be evenly balanced, and will apply the power equally well in both directions of the movement of the operating or vibratory lever, and will enable me to connect two revolving shafts with each other without the employment of belts.

The improvement consists, essentially, in combining a double-crank shaft with a vibratory lever pivoted coincidently with the centered axis of said shaft, and connecting the said lever upon opposite sides of the said shaft by links and rocking arms; and the improvement further consists in connecting said vibratory lever with a rotary shaft, and in certain constructions and combinations of parts hereinafter particularly described and claimed.

Figure 1:
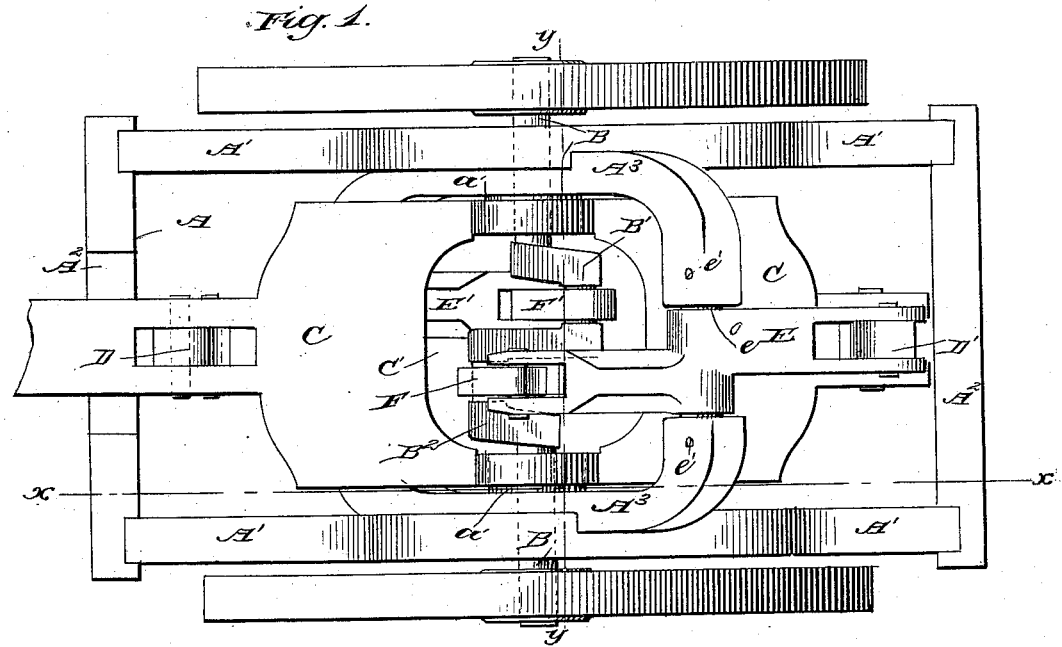
Figure 2:
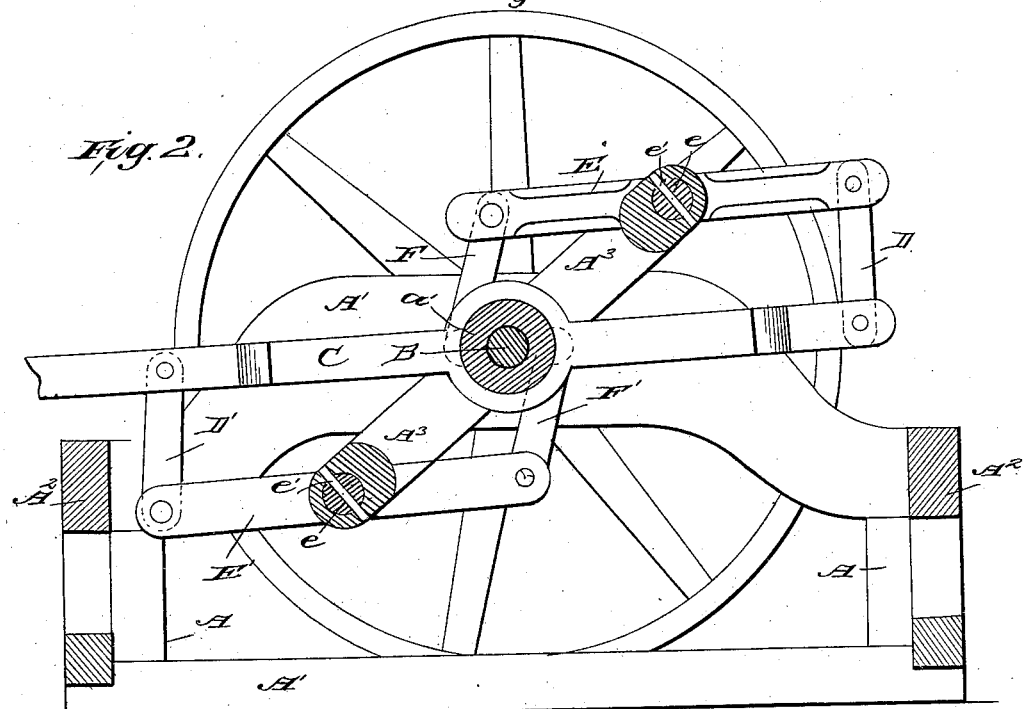

In the accompanying drawings, Figure 1 is a plan of my improved machine; Fig. 2, a sectional elevation in the line $x\,x$ of Fig. 1; Fig. 3, a similar representation in the line $y\,y$ of Fig. 1, and Fig. 4 a side elevation of my machine connected with a rotary shaft.

The frame A is strongly built, having side pieces, A', end pieces, A², and cross-braces A³, the latter of which serve not only to brace the frame, but to support some of the elements of the machine. A shaft, B, having cranks B' B² disposed diametrically opposite each other, is supported in bearings $a$ in the side pieces, A', of the frame, and said bearings are made with trunnions $a'$, projecting from their inner sides, which form bearings for a vibratory lever, C, coincident with the bearings of the shaft, by which means the lever may extend across the shaft and be connected at opposite sides thereof with links D D', which latter are connected by rocking arms E E' and links F F' with the cranks B' B² of the crank-shaft. The rocking arms E E' are journaled upon fixed shafts $e$, passing into the cross-braces A³, and secured thereto by keys $e'$. The shafts $e$ may thus be made of wrought iron or steel, while the braces A³ are cast upon the frame, and thus provide a strong, hard, and smooth bearing, easily turned, and then fitted into the frame-braces, upon which the rocking arms may be journaled.

I am enabled by the above-described combination of parts to compound the leverage and equally balance the moving parts upon opposite sides of the crank-shaft, and thus permit the machine to run at a high rate of speed with an easy movement.

The lever C has a central yoke, C', which passes around the moving links and arms of the crank-shaft, and has its bearings upon opposite sides of the frame, and will be held securely against twisting or binding unequally upon its bearings when in motion. A strong and compact arrangement of parts is obtained by the above-described means, which is well adapted for use upon either heavy or light machinery.

The frame may be either bolted to the floor or to suitable foundations; or it may be bolted to the wall or ceiling of a building when used in connection with the shafting.

A double set of parts, as above described, is used in connection with a crank-shaft having double cranks placed at right angles with each other, to more completely overcome dead centers and increase the power of the machine.

When one shaft is to be driven from another shaft, the handle end of the lever C is connected by a pitman, G, with a crank-pin upon a shaft, H, by which means I am enabled to dispense with belts and attain a very high rate of speed, which is required in connection with dynamos, sawing machinery, and for many other purposes. A positive connection is thus established between the driving and the driven shaft, and I am enabled to dispense with all of the annoyances and loss of time and power incident to the use of belts.

I claim as my invention and desire to secure by Letters Patent—

1. The combination, substantially as herein described, of a crank-shaft, a vibrating lever pivoted coincidently with and extending across said shaft, and connected to its cranks by links and rocking arms upon each side of said shaft, for the purpose specified.

2. The combination, substantially as herein described, of two crank-shafts and a vibratory lever connected with one of said shafts by links and rocking arms upon opposite sides of the shaft at one of its ends and by links with the crank-shaft at the other end of said lever, for the purpose specified.

3. The combination, substantially as herein described, of the frame A, having bearings $a$ and trunnion projections $a'$, a crank-shaft fitted in said bearings, and a vibratory lever, C, fulcrumed upon said trunnion projections and connected with the crank-shaft, substantially as described.

4. The combination, with the frame A, of the vibratory lever C, a crank-shaft, B, links D D', rocking arms E E', and links F F', substantially as described.

5. The combination, with the frame A, of the double-crank shaft B, links D D', rocking arms E E', links F F', and a vibratory lever, C, pivoted coincidently with the shaft B, and having a yoke, C', to encircle the moving cranks and links, substantially as described, for the purpose specified.

6. The combination, substantially as described, of the frame A, having cross-braces $A^3$, consisting of shafts $e$, fitted within castings projecting from the side pieces of the frame, a vibratory lever, and a rocking arm supported upon the shaft $e$ and connected with the said lever and crank-shaft by links D F, substantially as described.

JAMES F. HANLEY.

Witnesses:
SOLON C. KEMON,
CHAS. A. PETTIT.